June 9, 1925.
C. F. JONES
ELECTRIC TOASTER
Filed Dec. 1, 1924
1,541,222
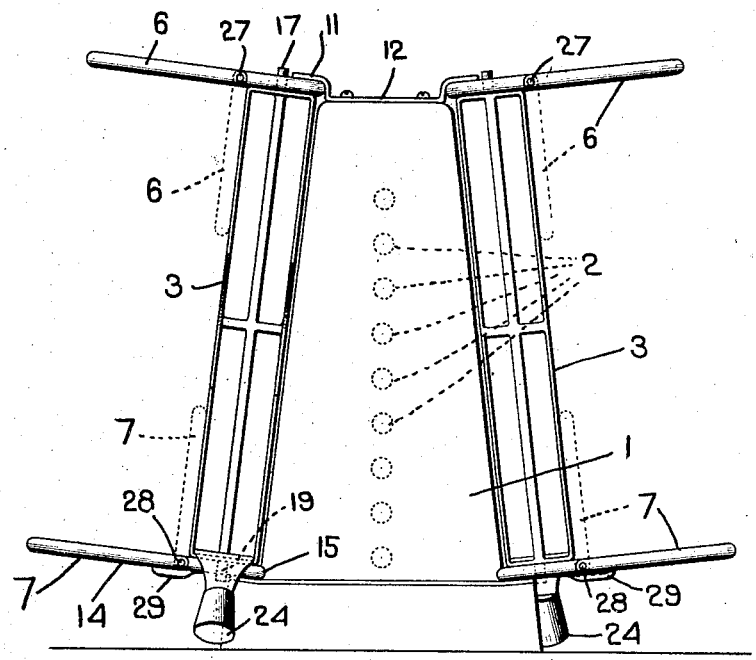
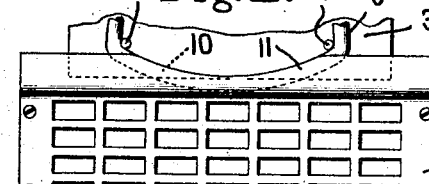
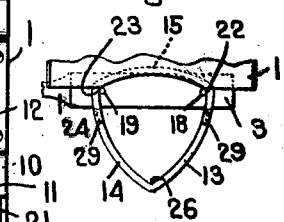
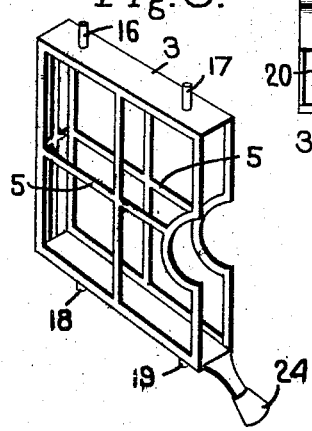
Inventor.
Charles F. Jones
by Heard Smith & Tennant
Attys Patented June 9, 1925.

1,541,222

UNITED STATES PATENT OFFICE.

CHARLES F. JONES, OF NEWTON HIGHLANDS, MASSACHUSETTS.

ELECTRIC TOASTER.

Application filed December 1, 1924. Serial No. 753,088.

*To all whom it may concern:*

Be it known that I, CHARLES F. JONES, a citizen of the United States, and resident of Newton Highlands, county of Middlesex, State of Massachusetts, have invented an Improvement in Electric Toasters, of which the following description, in connection with the accompanying drawing, is a specification, like characters on the drawing representing like parts.

This invention relates to electric toasters and particularly to the means for reversing the position of the toast.

The object of the invention is to provide an electric toaster with a novel means for supporting and reversing or turning the toast all as will be more fully hereinafter set forth.

In order to give an understanding of the invention I have illustrated in the drawings a selected embodiment thereof which will now be described after which the novel features will be pointed out in the appended claims.

Fig. 1 is an end elevation of a toaster embodying my invention;

Fig. 2 is a plan view with a portion broken out;

Fig. 3 is a perspective view of the toast holder removed.

Fig. 4 is a fragmentary bottom plan view.

In the drawings 1 indicates a frame of any suitable construction on which the heating unit is supported. The heating unit is shown as a plurality of heating coils 2 that extend horizontally and are arranged in a vertical tier as usual in many electric toasters.

The toast holder is shown at 3, there being two toast holders, one on each side of the frame. Each toast holder is open at one end for the reception of a slice of bread and the sides 5 of the toast holder are of open or grid work so as to not interfere with the toasting operation.

Each toast holder is supported between two guiding members 6 and 7, one situated above the toast holder and the other below the latter. Each guiding member has a general triangular shape and each side of each holder is curved on the arc of a circle struck from the opposite apex as a center.

The guiding members may conveniently be formed of heavy wire. The upper guiding member 6 has the three sides 8, 9 and 10, the side 10 being secured to the frame 1 in some suitable way. In the present embodiment of the invention this side 10 is shown as underlying the edge 11 of the cap piece 12 and may be secured to said edge in any suitable way. The lower guiding member 7 is formed in a similar way and has the three sides 13, 14 and 15, the side 15 being rigidly secured to the frame in any suitable way.

The two guiding members are so supported that the sides 8 and 9 of the upper member and 13 and 14 of the lower member project outwardly as shown in Fig. 1.

The toast holder is confined between the upper and lower guiding members and it has projecting from its upper edge two pivot pins 16 and 17 and from its lower edge two similar pivot pins 18 and 19. These pivot pins are so disposed and the upper and lower guiding members are so situated that when the toast holder is in operative position, as shown in full lines Figs. 1 and 2, the two pins 16 and 17 at the upper edge thereof will rest in the two apices 20 and 21 of the upper triangular guiding member and the two lower pins 18 and 19 will rest in the apices 22, 23 of the lower guiding member.

Each toast holder is provided with a handle 24 by which it may be operated or reversed. In order to reverse the toast holder the handle 24 is grasped and swung to the left, Fig. 2. During the first part of the swinging movement the toast holder will turn about the pins 16, 18 as pivots, these pins resting in the apices 20, 22 and as the toast holder swings the pins 17 and 19 will move outwardly along the curved sides 9 and 14 of the guiding members, it being remembered that these sides are formed on curves struck from the apex as a center.

The dotted line position Fig. 2 shows the toast holder during its swinging movement.

When the toast holder has been moved into a position to bring the pins 17 and 19 into the apices 25, 26 then further swinging movement of the toast holder about the pins 16 and 18 is prevented and continued pressure on the handle 24 will cause the toast holder to fulcrum about the pins 17 and 19 which are then journalled in the apices 25, 26. During the swinging movement of the toast holder about the pins 17 and 19 the opposite end of the toast holder will swing from the left toward the right in Fig. 2 and the pins 16 and 18 will move across the curved sides 10 and 15 of the guiding members. When this swinging movement has been carried to a point where the pins 16 and 18 engage in the apices 21 and 23 then the toast holder will fulcrum again about the pins 16 and 18 while the swinging movement continues and the pins 17 and 19 move across the sides 8 and 13 of the guiding members, this movement continuing until the fulcrum pins 17 and 19 are brought into the apices 20 and 22, at which time the toast holder will be completely reversed from the position shown in Fig. 2 and it will be held between the guiding members with the upper pins 16 and 17 resting in the apices 21, 20 and the lower pins 18, 19 resting in the apices 23, 22.

With this construction the toast holder is guided throughout its entire turning movement and the reversing can be accomplished quickly and with simply one swinging movement of the arm 24.

In order to reduce the space which is necessary for storing the toaster when it is not in use I propose to make each guiding member in two sections which are pivoted together.

The side arms 8 and 9 of the upper guiding member are jointed as shown at 27 so that the end of said member may be swung downwardly against the toast holder as shown in dotted lines Fig. 1.

The sides 13 and 14 of the lower guiding member are also jointed as shown at 28, the joint being constructed so that the outer end of this member may be swung upwardly as shown in dotted lines.

Each arm of the lower guiding member is provided with a stop 29 adjacent the pivot 28 on which the swinging portion of the member rests when it is in its operative position.

I claim—

1. In an electric toaster, the combination with a frame supporting the heating element, of two skeleton guiding members extending laterally from the frame, each guiding member having a triangular shape with each side curved on an arc struck from the opposite apex, a toast holder situated between the guiding members and having two pivot pins extending from its upper edge into the upper guiding member and two pivot pins extending from its lower edge into the lower guiding member, the distance between the pivot pins of each pair being substantially the same as the radius of the arc on which each side of the guiding member is formed, whereby the toast holder may be reversed by swinging it first about the pivot pins adjacent one edge and then about the pivot pins adjacent the other edge.

2. In an electric toaster, the combination with a frame supporting the heating element, of two skeleton guiding members extending laterally from the frame, each guiding member having a triangular shape with each side curved on an arc struck from the opposite apex, a toast holder situated between the guiding members and having two pivot pins extending from its upper edge into the upper guiding member and two pivot pins extending from its lower edge into the lower guiding member, the distance between the pivot pins of each pair being substantially the same as the radius of the arc on which each side of the guiding member is formed, whereby the toast holder may be reversed by swinging it first about the pivot pins adjacent one edge and then about the pivot pins adjacent the other edge, the guiding members being jointed and foldable against the toast holder when the latter is in operative position.

In testimony whereof I have signed my name to this specification.

CHARLES F. JONES.